United States Patent
Kawata et al.

(10) Patent No.: US 7,110,243 B2
(45) Date of Patent: Sep. 19, 2006

(54) ELECTRIC DOUBLE LAYER CAPACITOR

(75) Inventors: Yohei Kawata, Hirakata (JP); Hiroshi Nakajima, Hirakata (JP)

(73) Assignee: Sanyo Electric Co., Ltd., Moriguchi (JP)

(*) Notice: Subject to any disclaimer, the term of this patent is extended or adjusted under 35 U.S.C. 154(b) by 0 days.

(21) Appl. No.: 10/917,440

(22) Filed: Aug. 13, 2004

(65) Prior Publication Data

US 2005/0041371 A1    Feb. 24, 2005

(30) Foreign Application Priority Data

Aug. 20, 2003    (JP)    ............... 2003-296500

(51) Int. Cl.
*H01G 9/00*    (2006.01)

(52) U.S. Cl. .............. 361/502; 361/504; 361/508; 361/512; 361/516; 361/523

(58) Field of Classification Search ........ 361/502–504, 361/508–512, 516–519, 523–528; 29/25.03
See application file for complete search history.

(56) References Cited

U.S. PATENT DOCUMENTS

| | | | | |
|---|---|---|---|---|
| 4,840,858 A | * | 6/1989 | Furukawa et al. | 429/330 |
| 5,089,070 A | * | 2/1992 | McAndrew | 156/89.14 |
| 5,827,602 A | * | 10/1998 | Koch et al. | 429/328 |
| 6,242,135 B1 | * | 6/2001 | Mushiake | 429/304 |
| 6,479,192 B1 | * | 11/2002 | Chung et al. | 429/338 |
| 6,487,066 B1 | * | 11/2002 | Niiori et al. | 361/502 |
| 6,489,062 B1 | * | 12/2002 | Watanabe et al. | 429/231.95 |
| 6,580,599 B1 | * | 6/2003 | Matsuo | 361/504 |
| 6,635,384 B1 | * | 10/2003 | Bahar et al. | 429/188 |
| 6,733,544 B1 | * | 5/2004 | Takasugi et al. | 29/25.03 |
| 2003/0202316 A1 | * | 10/2003 | Kawasato et al. | 361/502 |

FOREIGN PATENT DOCUMENTS

JP    2000-232040    8/2000

* cited by examiner

*Primary Examiner*—Nguyen T. Ha
(74) *Attorney, Agent, or Firm*—Armstrong, Kratz, Quintos, Hanson & Brooks, LLP

(57) ABSTRACT

An electric double layer capacitor comprises a pair of polarizable electrodes impregnated with an electrolytic solution comprising an organic solvent and a supporting electrolyte dissolved in the organic solvent, and a gasket comprising a fluororesin. The organic solvent comprises propylene carbonate (PC), and the fluororesin for the gasket comprises a tetrafluoroethylene-perfluoroalkylvinylether copolymer (PFA).

2 Claims, 2 Drawing Sheets

F I G. 3

| | Ratio of PC (%) | Gasket | Supporting electrolyte | Active substance | Capacitance retention ratio (%) |
|---|---|---|---|---|---|
| Example 1 | 5 | PFA | $(C_2H_5)_4NBF_4$ | Active carbon | 75 |
| Example 2 | 20 | PFA | $(C_2H_5)_4NBF_4$ | Active carbon | 82 |
| Example 3 | 50 | PFA | $(C_2H_5)_4NBF_4$ | Active carbon | 84 |
| Example 4 | 70 | PFA | $(C_2H_5)_4NBF_4$ | Active carbon | 86 |
| Example 5 | 80 | PFA | $(C_2H_5)_4NBF_4$ | Active carbon | 90 |
| Example 6 | 100 | PFA | $(C_2H_5)_4NBF_4$ | Active carbon | 90 |
| Example 7 | 100 | PFA | $(CH_3)(C_2H_5)_3NBF_4$ | Active carbon | 90 |
| Example 8 | 100 | PFA | $LiPF_6$ | Active carbon | 78 |
| Example 9 | 100 | PFA | $(C_2H_5)_4NBF_4$ | CNT | 76 |
| Comparative Example 1 | 0 | PFA | $(C_2H_5)_4NBF_4$ | Active carbon | 51 |
| Comparative Example 2 | - | PFA | $(C_2H_5)_4NBF_4$ | Active carbon | 56 |
| Comparative Example 3 | 100 | Polyamide | $(C_2H_5)_4NBF_4$ | Active carbon | 30 |

# ELECTRIC DOUBLE LAYER CAPACITOR

FIELD OF THE INVENTION

The present invention relates to an electric double layer capacitor which is highly heat-resistant so that soldering thereof can be achieved in a reflow oven.

BACKGROUND OF THE INVENTION

FIG. 1 is a sectional view of a conventional electric double layer capacitor. The electric double layer capacitor includes a pair of polarizable electrodes 1, 2 impregnated with an electrolytic solution and stacked with the intervention of a separator 3, and an electrically conductive case 4b housing the polarizable electrodes 1, 2. The upper polarizable electrode 1 is covered with an electrically conductive lid 4a. The lid 4a and the case 4b respectively contact the polarizable electrodes 1 and 2 with the intervention of electric collectors 5 and 6. The peripheral portions of the lid 4a and the case 4b are sealed with a gasket 7. Thus, the lid 4a and the case 4b are electrically isolated from each other by the gasket 7, and the electrolytic solution is prevented from leaking out of the case 4b.

In general, the electric double layer capacitor is soldered to a printed board by the following reflow process. A solder paste is first applied onto the printed board, and the electric double layer capacitor is placed on the solder paste. The electric double layer capacitor and the board are put in a reflow oven, and heated at a high temperature on the order of 250°0 C. in the reflow oven to melt the solder paste. Thus, the electric double layer capacitor is soldered to the board.

An exemplary material conventionally employed for the gasket 7 of the electric double layer capacitor is polypropylene (PP) which is excellent in resilience, creep resistance and formability and less costly (see Japanese Unexamined Patent Publication No. 2000-232040). However, the polypropylene has a low heat resistant temperature, so that the gasket 7 is liable to be deformed by the heat of the reflow oven.

To solve the problem associated with the reflow heat, Japanese Unexamined Patent Publication No. 2002-56827, for example, proposes that a highly heat-resistant fluororesin is employed as a material for a gasket of a secondary battery and a nonaqueous electrolytic solution having a boiling point of not lower than 200° C. at an ordinary pressure is employed.

Where the fluororesin is employed as the material for the gasket 7, however, the fluororesin chemically reacts with the nonaqueous electrolytic solution at a high temperature in the reflow process depending on the kind of the electrolytic solution. This results in deformation of the gasket 7.

Further, the nonaqueous electrolytic solution is degraded by the chemical reaction, whereby the charge/discharge characteristic of the electric double layer capacitor is deteriorated.

It is therefore an object of the present invention to provide an electric double layer capacitor which includes a gasket less liable to be deformed at a high temperature in a reflow oven and is excellent in charge/discharge characteristic.

SUMMARY OF THE INVENTION

An electric double layer capacitor according to the present invention comprises: a pair of polarizable electrodes 1, 2 impregnated with an electrolytic solution comprising an organic solvent and a supporting electrolyte dissolved in the organic solvent; and a gasket 7 comprising a fluororesin; wherein the organic solvent comprises propylene carbonate (PC); wherein the fluororesin for the gasket 7 comprises a tetrafluoroethylene-perfluoroalkylvinylether copolymer (PFA).

As will be described later, a reaction between the gasket and the electrolytic solution at a high temperature can be suppressed by employing the tetrafluoroethylene-perfluoroalkylvinylether copolymer (PFA) as a material for the gasket and employing the propylene carbonate (PC) as the organic solvent. Thus, the deformation of the gasket and the degradation of the electrolytic solution can be prevented. Therefore, the deterioration of the charge/discharge characteristic of the electric double layer capacitor can be prevented.

BRIEF DESCRIPTION OF THE DRAWINGS

FIG. 3 is a table showing capacitance retention ratios in Examples 1 to 9 and Comparative Examples 1 to 3.

DETAILED DESCRIPTION OF THE PREFERRED EMBODIMENTS

Figure 1:
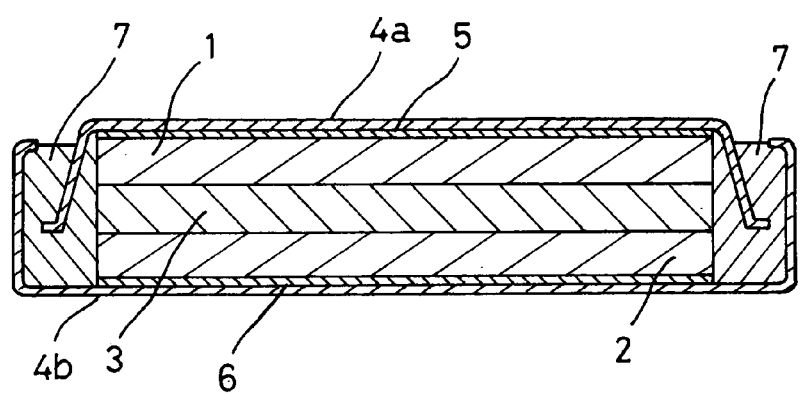
FIG. 1 is a sectional view of an electric double layer capacitor.

The electric double layer capacitor according to the present invention has the same construction as the conventional electric double layer capacitor shown in FIG. 1.

The polarized electrodes 1, 2 are composed of an active substance and a binder and, if the active substance has a low electrical conductivity, an electrically conductive material. Examples of the active substance include: active carbon powder prepared by activating sawdust, coconut shells or pitch; active carbon materials prepared by infusibilizing and activating phenol, rayon, acryl or pitch fibers to prepare active carbon powder or active carbon fibers, and forming the active carbon fibers into a felt, a thread or a sheet or sintering the active carbon powder; carbon materials such as carbon nanotubes; and metal compounds.

Examples of the binder include polytetrafluoroethylene, polyvinylidene fluoride, polyvinyl pyrrolidone, polyvinyl chloride, polyethylene, polypropylene, polyfluoroethylenepropylene, styrene-butadiene rubbers, carboxymethylcellulose and fluororubbers. These binders are known to be commonly used for the electric double layer capacitor.

Examples of the electrically conductive material include natural graphite such as scaly graphite and earthy graphite, synthetic graphite, carbon black, acetylene black and carbon fibers.

The separator 3 is preferably an insulative film having a high ion permeability and a predetermined mechanical strength. More specifically, exemplary materials for the separator 3 include glass fibers, polyphenylene sulfide, polyethylene terephthalate, polyamides and polyimides. The separator 3 has pore diameters of about 0.01 μm to about 10 μm, and a thickness of about 5 μm to about 100 μm.

The electrolytic solution to be contained in the polarizable electrodes 1, 2 is prepared by dissolving the supporting electrolyte in the organic solvent comprising propylene carbonate. The organic solvent may comprise a second organic solvent in addition to the propylene carbonate. Examples of the second organic solvent include cyclic esters, chain esters, cyclic ethers and chain ethers. More specific examples of the second organic solvent include ethylene carbonate, butylene carbonate, dimethyl carbonate, diethyl carbonate, γ-butyrolactone, 2-methyl-γ-butyrolactone, acetyl-γ-butyrolactone, γ-valerolactone, 1,2-dimethoxyethane, 1,2-ethoxyethane, diethyl ether, diethylene glycol dialkyl ethers, triethylene glycol diethyl ether, ethylene glycol dialkyl ethers, diethylene glycol dialkyl ethers, triethylene glycol dialkyl ethers, tetraethylene glycol dialkyl ethers, dipropyl carbonate, methyl ethyl carbonate, methyl butyl carbonate, ethyl propyl carbonate, butyl propyl carbonate, alkyl propionates, dialkyl malonates, alkyl acetates, tetrahydrofuran (THF), alkyltetrahydrofurans, dialkyltetrahydrofurans, alkoxytetrahydrofurans, dialkoxytetrahydrofurans, 1,3-dioxolane, alkyl-1,3-dioxolanes, 1,4-dioxolane, 2-methyltetrahydrofuran, dimethyl sulfoxide, formamide, dimethylformamide, dioxolane, acetonitrile, nitromethane, methyl formate, methyl acetate, methyl propionate, ethyl propionate, phosphate triesters, maleic anhydride, sulfolane and 3-methylsulfolane, and mixtures of any of these organic solvents.

Tetraethylammonium tetrafluoroborate or triethylmethylammonium tetrafluoroborate is preferably employed as the supporting electrolyte. One or more of $(C_2H_5)_4PBF_4$, $(C_3H_7)_4$ $PBF_4$, $(C_2H_5)_4PPF_6$, $(C_2H_5)_4PCF_3SO_4$, $(C_2H_5)_4NPF_6$, $LiClO_4$, $LiPF_6$, $LiBF_4$ and $LiN(CF_3SO_2)_2$ may be employed as the supporting electrolyte.

The electric collectors 5, 6 are each composed of an electrically conductive paint prepared by mixing graphite powder and water glass, or a mesh material such as of stainless steel, aluminum or titanium.

The gasket 7 is composed of a tetrafluoroethylene-perfluoroalkylvinylether copolymer. For further improvement of the sealability of the gasket 7, a liquid seal agent prepared by dissolving one or more of asphalt, a hydrocarbon such as a butyl rubber, a fluorine-containing oil, chlorosulfonated polyethylene and an epoxy resin in a solvent may be applied onto the gasket 7.

Production of Electric Double Layer Capacitor

EXAMPLE 1

An electric double layer capacitor according to the present invention was produced in the following manner.

Preparation of Polarizable Electrodes

First, active carbon, acetylene black and polytetrafluoroethylene were mixed in a weight ratio of 90:5:5. The resulting mixture was formed into a disk having a diameter of 10 mm and a thickness of 0.5 mm, and then the disk was dried at 150° C. for two hours. Thus, polarizable electrodes 1, 2 were prepared.

Preparation of Electrolytic Solution

First, an organic solvent was prepared by mixing propylene carbonate and γ-butyrolactone in a volume ratio of 5:95. Then, tetraethylammonium tetrafluoroborate $((C_2H_5)_4NBF_4)$ as a supporting electrolyte was dissolved in the organic solvent at a concentration of 1.0 mol/l. Thus, an electrolytic solution was prepared.

Assembling of Capacitor

As shown in FIG. 1, an electrically conductive paint prepared by mixing graphite powder and water glass was applied onto interior surfaces of a stainless steel lid 4a and a case 4b, whereby electric collectors 5, 6 were formed. Thereafter, the polarizable electrode 2 was placed on the bottom of the case 4b, and then the polarizable electrode 1 was stacked on the polarizable electrode 2 with the intervention of a separator 3. After the polarizable electrodes 1, 2 were impregnated with the electrolytic solution, a gasket 7 was fitted on the interior surface of the case 4b. Then, the lid 4a was placed on the polarizable electrode 1, and the periphery of the lid 4a was sealed with the gasket 7. Thus, an electric double layer capacitor was produced.

EXAMPLE 2

An electric double layer capacitor was produced in substantially the same manner as in Example 1, except that the mixing volume ratio between propylene carbonate and γ-butyrolactone was 20:80.

EXAMPLE 3

An electric double layer capacitor was produced in substantially the same manner as in Example 1, except that the mixing volume ratio between propylene carbonate and γ-butyrolactone was 50:50.

EXAMPLE 4

An electric double layer capacitor was produced in substantially the same manner as in Example 1, except that the mixing volume ratio between propylene carbonate and γ-butyrolactone was 70:30.

EXAMPLE 5

An electric double layer capacitor was produced in substantially the same manner as in Example 1, except that the mixing volume ratio between propylene carbonate and γ-butyrolactone was 80:20.

EXAMPLE 6

An electric double layer capacitor was produced in substantially the same manner as in Example 1, except that the mixing volume ratio between propylene carbonate and γ-butyrolactone was 100:0.

EXAMPLE 7

An electric double layer capacitor was produced in substantially the same manner as in Example 6, except that triethylmethylammonium tetrafluoroborate $((CH_3)(C_2H_5)_3NBF_4)$ was employed as the supporting electrolyte.

EXAMPLE 8

An electric double layer capacitor was produced in substantially the same manner as in Example 6, except that lithium hexafluorophosphate ($LiPF_6$) was employed as the supporting electrolyte.

EXAMPLE 9

An electric double layer capacitor was produced in substantially the same manner as in Example 6, except that carbon nanotubes (CNT) were employed as an active substance for the polarizable electrodes.

COMPARATIVE EXAMPLE 1

An electric double layer capacitor was produced in substantially the same manner as in Example 1, except that γ-butyrolactone was employed as the organic solvent for the electrolytic solution.

COMPARATIVE EXAMPLE 2

An electric double layer capacitor was produced in substantially the same manner as in Example 1, except that an organic solvent prepared by mixing γ-butyrolactone and 3-methylsulfolane in a volume ratio of 50:50 was employed as the organic solvent for the electrolytic solution.

COMPARATIVE EXAMPLE 3

An electric double layer capacitor was produced in substantially the same manner as in Example 1, except that polyamide was employed as the material for the gasket 7.

A charge/discharge characteristic test was performed on the electric double layer capacitors of Examples 1 to 9 and Comparative Examples 1 to 3. In the test, the electric double layer capacitors were each passed through a reflow oven. The reflow oven temperature conditions were such that the reflow oven was heated at 180° C. for one minute in a preheating step, then at 180° C. for one minute, at 250° C. for one minute and at 180° C. for one minute in a heating step, and naturally cooled to 25° C. Thereafter, the electric double layer capacitors were each charged at a constant electric current of 0.01 mA to a charge termination voltage of 2.5V, and then discharged at a constant electric current of 0.1 mA to a discharge termination voltage of 0V. This charge/discharge cycle was performed for 20 cycles. Then, the capacitance retention ratio of each of the electric double layer capacitors was determined from the following expression:

$$\text{CAPACITANCE RETENTION RATIO} = \frac{\text{DISCHARGE CAPACITANCE AT 20th CYCLE}}{\text{DISCHARGE CAPACITANCE AT 1st CYCLE}} \times 100$$

The results are shown in FIG. 3.

As can be understood from FIG. 3, the electric double layer capacitors of Examples 1 to 9 which employed the propylene carbonate (PC) as the organic solvent for the electrolytic solution and the tetrafluoroethylene-perfluoroalkylvinylether copolymer (PFA) as the material for the gasket each had a high capacitance retention ratio as compared with the electric double layer capacitors of Comparative Examples 1 to 3 which did not employ the propylene carbonate and the tetrafluoroethylene-perfluoroalkylvinylether copolymer in combination.

Figure 2:
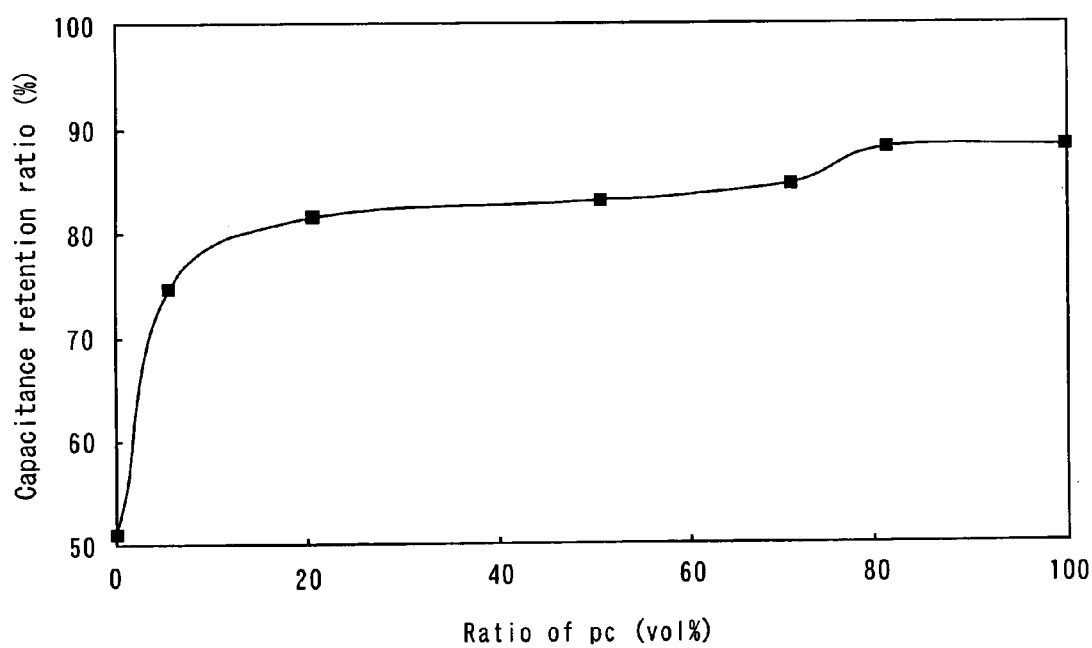
FIG. 2 is a correlation diagram illustrating a relationship between a capacitance retention ratio and the volume ratio of propylene carbonate (PC) in an electrolytic solution in the electric double layer capacitor.

A relationship between the mixing ratio of the PC in the organic solvent and the capacitance retention ratio determined on the basis of data obtained in Examples 1 to 6 and Comparative Example 1 is shown in FIG. 2. As can be understood from FIG. 2, the capacitance retention ratio was higher where the proportion of the propylene carbonate in the organic solvent was not lower than 80 vol %.

The electric double layer capacitor of Example 6 which employed tetraethylammonium tetrafluoroborate ($(C_2H_5)_4NBF_4$) as the supporting electrolyte and the electric double layer capacitor of Example 7 which employed triethylmethylammonium tetrafluoroborate ($(CH_3)(C_2H_5)_3NBF_4$) as the supporting electrolyte each had a higher capacitance retention ratio than the electric double layer capacitor of Example 8 which employed lithium hexafluorophosphate ($LiPF_6$) as the supporting electrolyte.

Further, a comparison between Example 6 and Example 9 indicates that the electric double layer capacitor which employed the active carbon as the active substance had a higher capacitance retention ratio than the electric double layer capacitor which employed the CNT as the active substance.

This is supposedly because the reaction between the gasket and the electrolytic solution which is liable to occur at a high temperature where the propylene carbonate (PC) is employed for the electrolytic solution and the tetrafluoroethylene-perfluoroalkylvinylether copolymer (PFA) is employed for the gasket 7 can more effectively be suppressed by employing the tetraethylammonium tetrafluoroborate ($(C_2H_5)_4NBF_4$) or the triethylmethylammonium tetrafluoroborate ($(CH_3)(C_2H_5)_3NBF_4$) as the supporting electrolyte and employing the active carbon as the active substance.

The electric double layer capacitors were each constructed as having a coin shape, but the shape and size of the inventive electric double layer capacitor are not particularly limited.

What is claimed is:

1. An electric double layer capacitor comprising:
   a pair of polarizable electrodes impregnated with an electrolytic solution comprising an organic solvent and a supporting electrolyte dissolved in the organic solvent; and
   a gasket comprising a fluororesin;
   wherein the organic solvent is a mixture of propylene carbonate (PC) and γ-butyrolactone;
   wherein the fluororesin for the gasket comprises a tetrafluoroethylene-perfluoroalkylvinylether copolymer (PFA);and
   wherein the propylene carbonate is present in proportion of not lower than in
   a volume ratio of 80% in the organic solvent.

2. An electric double layer capacitor as set forth in claim 1, wherein the supporting electrolyte comprises one of tetraethylammonium tetrafluoroborate ($(C_2H_5)_4NBF_4$) and triethylmethylammonium tetrafluoroborate ($(CH_3)(C_2H_5)_3NBF_4$).

* * * * *